United States Patent
Koyama et al.

(10) Patent No.: US 6,736,513 B2
(45) Date of Patent: May 18, 2004

(54) PROJECTION TYPE IMAGE DISPLAY APPARATUS

(75) Inventors: Takehiro Koyama, Tochigi (JP); Kiyohide Wada, Singapore (SG)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/154,294

(22) Filed: May 23, 2002

(65) Prior Publication Data

US 2002/0191158 A1 Dec. 19, 2002

(30) Foreign Application Priority Data

May 31, 2001 (JP) ........................................ 2001-165524

(51) Int. Cl.[7] ........................ G03B 21/00; G03B 21/18; G03B 21/26
(52) U.S. Cl. ............................ 353/31; 353/58; 353/59; 353/60; 353/61
(58) Field of Search ............................. 353/31, 52, 57, 353/58–59, 60–61

(56) References Cited

U.S. PATENT DOCUMENTS

| | | | | |
|---|---|---|---|---|
| 6,231,191 B1 | * | 5/2001 | Shiraishi et al. | 353/61 |
| 6,422,703 B1 | * | 7/2002 | Wang et al. | 353/61 |
| 6,447,121 B1 | * | 9/2002 | Woo | 353/52 |
| 6,471,357 B1 | * | 10/2002 | Hara et al. | 353/57 |
| 6,473,150 B1 | * | 10/2002 | Takushima et al. | 349/161 |
| 6,478,430 B2 | * | 11/2002 | Wada | 353/31 |

FOREIGN PATENT DOCUMENTS

| | | | | |
|---|---|---|---|---|
| JP | 63311338 A | * | 12/1988 | ........... G03B/27/32 |
| JP | 06-164621 | | 7/1994 | |
| JP | 2001-092419 | | 4/2001 | |

OTHER PUBLICATIONS

English abstract for JP2001–092419.

* cited by examiner

Primary Examiner—Russell Adams
Assistant Examiner—Magda Cruz
(74) Attorney, Agent, or Firm—Morgan & Finnegan, L.L.P.

(57) ABSTRACT

This invention discloses a projection type image display apparatus that includes a color separation optical system which separates illumination light into a plurality of chromatic rays of light, a plurality of image forming panels illuminated with the plurality of chromatic rays of light, respectively, a color synthesizing optical system which synthesizes rays of light emitted from the plurality of image forming panels illuminated therewith, and a plurality of cooling units which cool areas around the plurality of image forming panels, respectively, in which a cooling capacity (for example, specifications of a cooling unit or type of air-blowing fan) of at least one of the plurality of cooling units is different from those of the other cooling units. Thereby, cooling can be carried out most suitably for each color optical path, and cooling that is superior in efficiency and in balance can be carried out.

14 Claims, 9 Drawing Sheets

PROJECTION TYPE IMAGE DISPLAY APPARATUS

BACKGROUND OF THE INVENTION

1. Field of the Invention

This invention relates to a projection type image display apparatus for enlarging and projecting an image onto, for example, a screen.

2. Description of the Related Art

A three-panel type liquid crystal projector is known as a liquid crystal projector in which white light emitted from a light source is separated into three colors (red, green, and blue) by a wavelength-selectable dielectric memberane, rays of light that have passed through their respective liquid crystal panels (image forming panels) are thereafter synthesized by a dielectric memberane so as to produce a color image by use of three monochromatic-liquid crystal panels, and the color image is enlarged and projected onto, for example, a screen through a projection lens.

A high intensity lamp, such as an extra-high pressure mercury lamp, is used as the light source of a liquid crystal projector, and the reflector surface of the lamp reaches a high temperature.

The liquid crystal panel also undergoes a rise in temperature by being illuminated with light from the light source. The liquid crystal panel is illuminated by polarized light, and polarizing plates are used on the incident and outgoing sides of the liquid crystal panel as a pair.

In most cases, the polarizing plate to be used is a film type due to cost, but this is inferior to crystal in transmittance, and easily absorbs light in the form of heat. Additionally, polarized light is absorbed by the polarizing plate and is changed into heat when light in which a polarization plane rotates with respect to the transmitted-light axis of a polarizing plate by driving the liquid crystal passing through the polarizing plate.

Accordingly, there is a fear that display contrast will be lowered by heat if the heat absorbed by the liquid crystal panel and the polarizing plate as described above is not lowered by cooling from the outside in order to use them below a temperature at which reliability can be kept.

Therefore, there exist a method for, as disclosed in Japanese Patent No. 2860989 shown in FIG. 7, disposing an axial fan 102 under a dichroic prism 101 used for color synthesis and cooling three color liquid crystal panels 103 simultaneously, and a method for, as proposed in Japanese Laid-open Patent No. H05-53200 shown in FIG. 8, providing a sirocco fan 104 and an air chamber 106 used to supply air drawn by the fan to the three color panels 103.

In general, the respective rays of light separated into red, green, and blue are different from each other in quantity, and are different therefrom in heat distribution in the image forming panel. In the method disclosed in Japanese Patent No. 2860989 mentioned above, the three panels 103 are cooled by the single axial fan 102, and therefore, if the rotational speed of the fan is set according to an optical path that has a high exothermic energy in a case where the exothermic energy of the optical path is much higher than those of other optical paths, then the other optical paths will be excessively cooled. This is disadvantageous from the viewpoint of cooling efficiency.

In the method proposed in Japanese Laid-open Patent No. H05-53200 mentioned above, three optical paths share the fan with each other, and therefore it is extremely difficult to prepare a flow path design that considers the balance of a cooling capacity in the three color optical paths.

Additionally, in both of the methods, as shown in FIG. 9, openings 108 or shape of nozzles from which an air current is expelled are disposed in the vicinity of the liquid crystal panels 103 and the polarizing plates 107 attached to the prism 101, which are to be cooled. However, since cooling conditions and cooling balance in each optical path depend greatly on the size of the openings 108 or on the shape of the nozzle, trial and error through experimentation must be carried out to determine the size or shape of the openings 108 and nozzles.

In other words, a problem resides in the fact that air capacity can be enlarged by widening the openings 108, but on the contrary, if the openings 108 are narrowed, not only will air capacity decrease but also an area to which the cooling air is supplied will decrease.

Another problem resides in the fact that a higher cooling capacity is needed proportionately with a rise in brightness of the liquid crystal projector, and, as a result, the cooling fan and the air chamber become larger in size.

Therefore, in order to realize a size reduction and a noise reduction of the apparatus, there is a need to cool the apparatus more efficiently, and it has become extremely important to determine the cooling conditions and the cooling balance in each color optical path.

SUMMARY OF THE INVENTION

It is, therefore, an object of the present invention to provide a projection type image display apparatus whose optical elements, such as an image forming panel, a polarizing plate, and a prism disposed in each color optical path, are designed to be cooled efficiently.

In order to achieve the object, a projection type image display apparatus by which a color image is projected and displayed according to the present invention includes a color separation optical system which separates illumination light into a plurality of chromatic rays of light, a plurality of image forming panels illuminated with the plurality of chromatic rays of light, respectively, a color synthesizing optical system which synthesizes rays of light emitted from the plurality of image forming panels illuminated therewith, and a plurality of cooling units which cool areas around the plurality of image forming panels, respectively, in which a cooling capacity of at least one of the plurality of cooling units is different from those of the other cooling units.

For example, the plurality of cooling units are the same in kind, and the specifications of at least one of the cooling units differ from those of the other cooling units. In greater detail, the air capacity of an air-blowing fan is made different, or the shape of a duct by which the air current from the air-blowing fan is guided to areas around the image forming panels is made different from the other ones.

Alternatively, the kind of at least one of the cooling units can be made different from those of the other cooling units. In greater detail, an axial fan and a sirocco fan are used. Alternatively, a fan and a thermoelectric exchange element, such as a Peltier element, can be used.

If a polarizing element is disposed in the vicinity of each image forming panel (e.g., LCD panel), the polarizing element can also be cooled by each cooling unit.

In order to achieve the object, a projection type image display apparatus by which a color image is projected and displayed according to the present invention includes a color separation optical system which separates illumination light into a plurality of chromatic rays of light, a plurality of image forming panels to be illuminated with the plurality of chromatic rays of light, respectively, a color synthesizing optical system which synthesizes rays of light emitted from the plurality of image forming panels illuminated therewith, a plurality of cooling units which cool areas around the plurality of image forming panels, respectively, and a control circuit which controls the plurality of cooling units, in which the control circuit controls at least one of the plurality of cooling units independently of the other cooling units.

For example, if the plurality of cooling units each have an air-blowing fan, at least one of the air-blowing fans can be controlled so that the revolving speed of at least one differs from those of the other air-blowing fans.

Further, if there is provided a light-quantity changing member which changes the quantity of chromatic light that strikes at least one of the image forming panels, one of the cooling units that cools the image forming panel can be controlled in a different manner from a manner in which the other cooling units are controlled in accordance with a change in the quantity of incident light upon the image forming panel caused by the light-quantity changing member.

In this case, if a polarizing element is disposed in the vicinity of each image forming panel, the polarizing element can be cooled by each cooling unit in the same manner as above.

A detailed configuration of the projection type image display apparatus of the invention, the above and other objects and features of the invention will be apparent from the embodiments, described below.

DETAILED DESCRIPTION OF THE PREFERRED EMBODIMENTS

Hereinafter, preferred embodiments of the invention will be described in detail with reference to the drawings.

Figure 1:
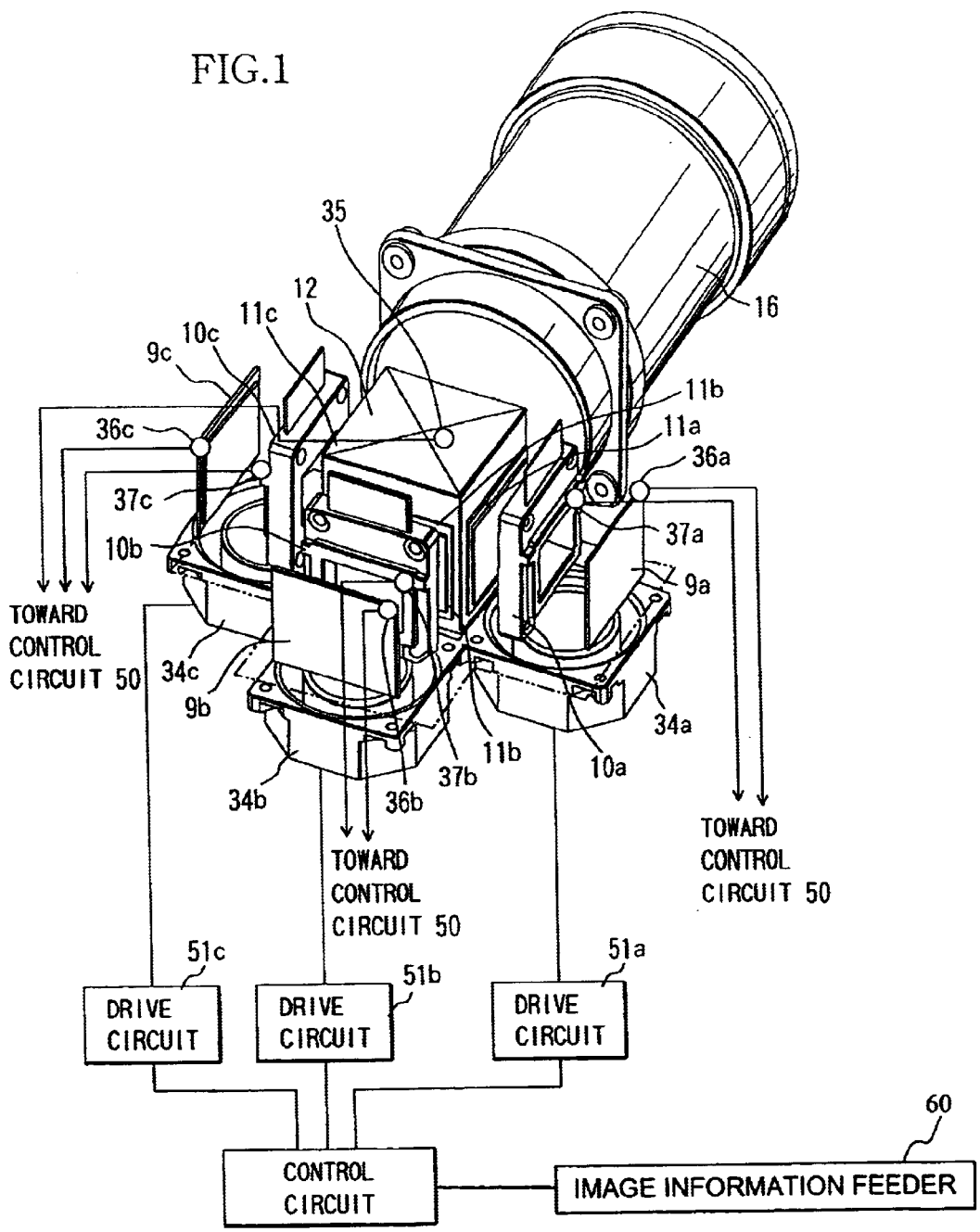
FIG. 1 is a perspective view showing a light modulating part, a projection optical system, and a cooling structure of the liquid crystal projector (projection type image display apparatus) which is an embodiment of the present invention.
Figure 2:
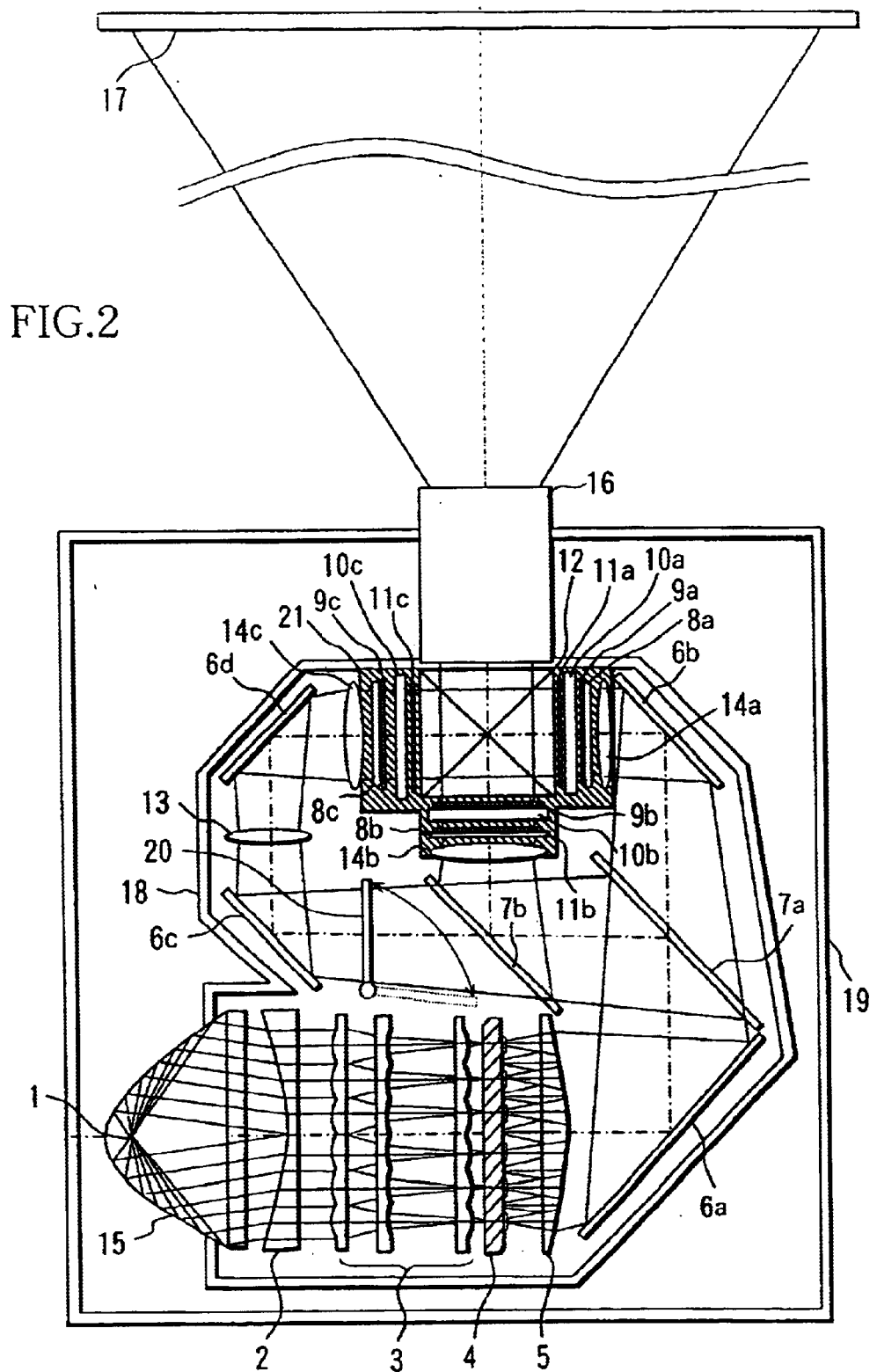
FIG. 2 is a plan view showing an optical structure of the liquid crystal projector.

FIG. 2 shows an optical structure of a three-panel type liquid crystal projector (projection type image display apparatus) which is an embodiment of the present invention. FIG. 1 shows a structure made up of a light modulation part, a color synthesizing system, and a projection optical system of the liquid crystal projector.

In the figures, 1 denotes an illumination light source, such as a high-intensity-extra-high voltage lamp or a metal halide lamp. Light emitted from the illumination light source 1 is reflected by a reflector 15, is then changed into parallel light by a condensing lens 2, and strikes a fly-eye lens group 3 in which a plurality of lenses are disposed like a gridiron.

An illumination beam of light condensed by the fly-eye lens group 3 enters a polarization conversion element 4, is then caused to adjust its polarizing direction, is then condensed by a lens 5, and is reflected by a mirror 6a.

The illumination beam of light reflected by the mirror 6a is subjected to color separation into the three primary color rays of red, green, and blue by dichroic mirrors 7a and 7b which constitute a color separation optical system. The rays then enter light modulating parts for blue, green, and red, respectively, via mirrors 6b, 7b, 6c, 6d and through lenses 14a, 14b, 13, 14c.

The light modulating parts are made up of half-wave plates 8a, 8b, 8c, incident-side polarizing plates 9a, 9b, 9c, liquid crystal panels (image forming panels) 10a (for blue), 10b (for green), 10c (for red), and outgoing-side polarizing plates 11a, 11b, 11c.

In this embodiment, the transmitted-light axes of the incident-side polarizing plates 9a, 9b, 9c and the transmitted-light axes of the liquid crystal panels 10a, 10b, 10c are arranged to point in the vertical direction when viewed from the incident side of the illumination light, and therefore the light reflected by the dichroic mirrors 7a, 7b strikes the half-wave plates 8a, 8b, 8c. The phase advance axis and the phase delay axis of each of the half-wave plates 8a, 8b, 8c are designed to have an angle of 45 degrees with respect to a linear-polarization recommendation input direction of each of the liquid crystal panels 10a, 10b, 10c. Rays of light that have passed through the incident-side polarizing plates 9a, 9b, 9c among rays of light emitted from the half-wave plates 8a, 8b, 8c enter the liquid crystal panels 10a, 10b, 10c.

Driving signals according to image information supplied from a personal computer or from an image information feeder, such as a television, video, or DVD player, for the liquid crystal projector are input to the liquid crystal panels 10a, 10b, 10c, and, based on the signals, each color image according to the supplied image is formed on each of the liquid crystal panels 10a, 10b, 10c. Thereby, each chromatic light incident on each of the liquid crystal panel is modulated. The liquid crystal projector and the image information feeder constitute a projection type image display system.

Rays of light emitted from the liquid crystal panels 10a, 10b, 10c for the respective colors pass through the outgoing-side polarizing plates 11a, 11b, 11c, and are subjected to color synthesis by a dichroic prism 12 which is a color synthesizing optical system. The light that has undergone color synthesis is enlarged and projected onto a screen 17 through a projection lens 16. Thus, a large full-color image is displayed.

The dichroic prism used in this embodiment is a cross dichroic prism formed by uniting four prisms, each of which assumes the shape of a right-angled triangular pole, together between which an X-shaped dichroic membrane is interposed.

Each optical component mentioned above is contained in an optical box 18, and the optical box 18 is contained in a body case 19. It is permissible to form a part of or the whole of the optical box 18 to be integral with the body case 19.

Air intake holes 21 for cooling the liquid crystal panels 10a, 10b, 10c, and the components therearound, i.e., the incident-side polarizing plates 9a, 9b, 9c, and the outgoing-side polarizing plates 11a, 11b, 11c are formed in the lower part of the optical box 18.

As shown in FIG. 1, axial fans 34a, 34b, 34c for three chromatic optical paths, respectively, which are used to supply cooling air to the liquid crystal panels 10a, 10b, 10c, the incident-side polarizing plates 9a, 9b, 9c, and the outgoing-side polarizing plates 11a, 11b, 11c are disposed inside the air intake holes 21.

In greater detail, the axial fan 34a for blue supplies cooling air to the incident-side polarizing plate 9a, the liquid crystal panel 10a, and the outgoing-side polarizing plate 11a which are placed in a blue optical path. The axial fan 34b for green supplies cooling air to the incident-side polarizing plate 9b, the liquid crystal panel 10b, and the outgoing-side polarizing plate 11b which are placed in a green optical path.

The axial fan 34c for red supplies cooling air to the incident-side polarizing plate 9c, the liquid crystal panel 10c, and the outgoing-side polarizing plate 11c which are placed in a red optical path. The cooling air is also supplied between the prism 12 and each of the outgoing-side polarizing plates 11a, 11b, 11c so as to cool the prism 12.

Herein, in a case where the temperature rise of the polarizing plate or the liquid crystal panel on, for example, the blue optical path is greater than those on the other two color optical paths, the polarizing plates 9a, 11a, and the liquid crystal panel 10a in the blue optical path can be effectively cooled by using a fan that has a large air capacity (wind speed) as the axial fan 34a for blue according to specifications different from those of the fans 34b, 34c placed in the other two color optical paths.

Further, any of the three color optical paths can be efficiently cooled, and an excellent cooling balance can be attained by allowing the other cooling fans to establish specifications that have a cooling capacity most suitable for a cooling condition needed to appropriately cool the polarizing plates and the liquid crystal panels in the other color optical paths.

As shown in FIG. 1, temperature sensors 36a, 36b, 36c for measuring the temperature of the incident-side polarizing plates 9a, 9b, 9c are disposed on the incident-side polarizing plates 9a, 9b, 9c. Temperature sensors 37a, 37b, 37c for measuring the temperature of the liquid crystal panels 10a, 10b, 10c are disposed on the liquid crystal panels 10a, 10b, 10c. A temperature sensor 35 for measuring the temperature of the cross diachronic prism 12 is disposed on the cross dichroic prism 12. Signals from the temperature sensors are sent to a control circuit 50. When the temperature measured by the temperature sensor exceeds a predetermined set value, the control circuit 50 outputs driving signals to drive circuits 51a, 51b, 51c by which a motor of the fan is driven so as to rotate the axial fans 34a, 34b, 34c.

Although the so-called transmission type liquid crystal panels 10a, 10b, 10c are used in this embodiment, reflection type liquid crystal panels or micro mirror elements can be used instead of the panel 10a, 10b, 10c.

Additionally, in the embodiment described above, the outgoing-side polarizing plates 11a, 11b, 11c can be disposed with an air space from the cross dichroic prism 12, or can be stuck directly onto the cross dichroic prism 12. If the outgoing-side polarizing plates 11a, 11b, 11c are stuck onto the cross dichroic prism 12, cooling air from each of fans 34a, 34b, 34c is sent also to each of the polarizing plates 11a, 11b, 11c and to the cross dichroic prism 12, thereby cooling the incident-side polarizing plates 9a, 9b, 9c, the liquid crystal panels 10a, 10b, 10c, the polarizing plates 11a, 11b, 11c, and the prism 12.

Figure 3:
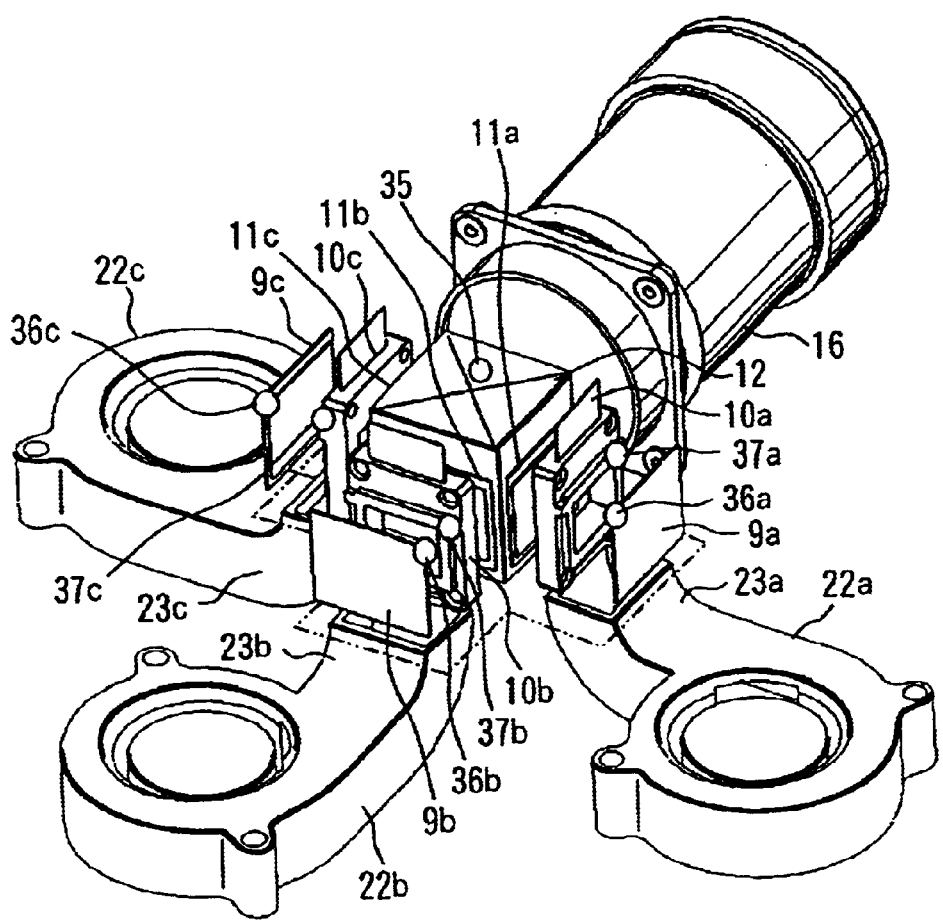
FIG. 3 is a perspective view showing a light modulating part, a projection optical system, and a cooling structure of the liquid crystal projector (projection type image display apparatus) which is another embodiment of the present invention.

Although an example in which the axial fan is used has been described in the embodiment shown in FIG. 1 and FIG. 2, an air-blowing structure made up of a sirocco fan and a duct, such as that shown in FIG. 3, can be used for each color optical path.

In a case where this air-blowing structure is used, sirocco fans 22a, 22b, 22c are disposed in such a manner that an opening of each duct 23a, 23b, 23c is directed toward the incident-side polarizing plates 9a, 9b, 9c, the liquid crystal panels 10a, 10b, 10c, and the outgoing-side polarizing plates 11a, 11b, 11c.

As a result of providing the ducts 23a, 2b, 23c, the sirocco fans 22a, 22b, 22c can be placed down disposed inside the liquid crystal projector as shown in FIG. 3, or the positions of the fans 22a, 22b, 22c can be easily changed by drawing the ducts 23a, 23b, 23c around. Therefore, the degree of freedom of the layout in the liquid crystal projector can be improved.

Additionally, since the sirocco fan has a structural advantage of being able to realize noise reduction more easily than an axial fan, use of the sirocco fan is advantageous in noise reduction of the liquid crystal projector itself.

By changing the specification (i.e., cooling capacity) of each sirocco fan in accordance with a cooling condition needed for each color optical path as in the embodiment shown in FIG. 1 and FIG. 2, the polarizing plates 9a to 9b, 11a to 11c, the liquid crystal panels 10a to 10c, and the prism 12 for each optical path can be most suitably cooled.

For example, if only the ducts are shaped to become different from each other for the three color optical paths in order to change the cooling condition, and if the fans that are the same in kind and in specifications are used, manufacturing costs can be reduced.

In the embodiment shown in FIGS. 1 through 3, descriptions have been given of the cases in which the three axial fans or the three sirocco fans that are the same in kind are used. Instead, an axial fan can be used for at least one color optical path among the three color optical paths, and a sirocco fan and a duct can be disposed for the remaining color optical paths.

In the embodiment shown in FIGS. 1 through 3, descriptions have been given of the cases in which the fans each of which has an air-blowing function are used. Instead, thermoelectric exchange elements, such as Peltier elements, can be used.

Further, even if the fans used for the three color optical paths are exactly the same in kind (same in specifications), the revolving speeds of the fans can be controlled independently of each other.

For example, if current or voltage to be input to a motor of a fan disposed in a color optical path that is needed to have the highest cooling capacity is made greater than current or voltage to be input to a motor of a fan disposed in other color optical paths, the revolving speed (i.e., air capacity) of the former fan becomes greater than that of the latter fans, and the polarizing plate, the liquid crystal panel, and the prism for each color optical path is cooled most suitably.

Under this condition, noise reduction can be achieved if the revolving speed of the fan disposed in the color optical path that is required to have the highest cooling capacity is raised whereas the revolving speeds of the other fans are lowered as much as possible.

In the liquid crystal projector shown in FIG. 2, the brightness of a display image can be changed by allowing a trimming filter 20, which can select the wavelength of transmitted light, to move into and out of an optical path of the three color optical paths.

Since the temperature of the polarizing plates 9a to 9c, 11a to 11c, that of the liquid crystal panels 10a to 10c, and that of the prism 12 are raised higher when the trimming filter 20 is retreated from the path so as to increase the brightness of the display image than when the trimming filter 20 is placed in the path, the cooling capacity must be enlarged.

Figure 4:
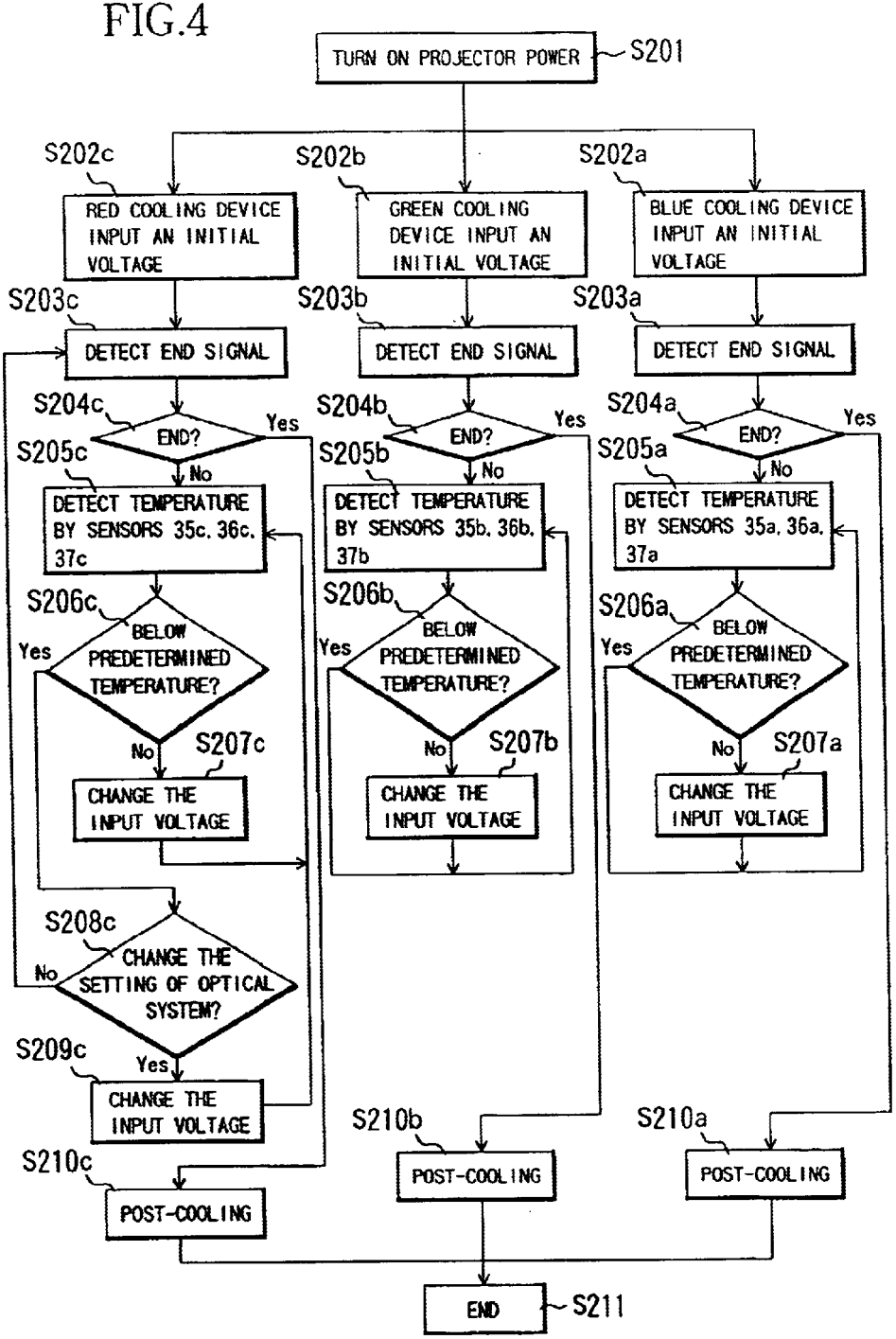
FIG. 4 is a flowchart showing the operation of the liquid crystal projector (projection type image display apparatus) which is another embodiment of the present invention.

FIG. 4 is a flowchart showing the operation of the control circuit 50 in a case in which the trimming filter 20 is provided in the liquid crystal projector of the embodiment shown in FIGS. 1 through 3.

When a projector power source is first turned on (step 201, the word "step" in this specification is abbreviated to "s" in figures), the control circuit 50 turns on the illumination light source 1, and an initial voltage is applied to the drive circuits 51a, 51b, 51c of the fans 34a to 34c, 22a to 22c for the respective color optical paths so that the polarizing plates 9a to 9c, 11a to 11c and the liquid crystal panels 10a to 10c begin to be cooled (steps 202a, 202b, and 202c).

The value of this voltage is one that makes it possible to obtain a fan-revolving speed by which the temperature of the liquid crystal panels 10a to 10c and that of the polarizing plates 9a to 9c, 11a to 11c fall below a rated temperature when a stationary state is reached at room temperature. The voltage value to be used is a premeasured one.

Thereafter, a power OFF signal of the liquid crystal projector generated by the user's operations is detected (steps 203a, 203b, 203c), and detection is performed as to whether the OFF signal has been input or not (steps 204a, 204b, 204c). If the OFF signal has not been input, the temperature is measured by the temperature sensor 35 disposed on the prism 12, the temperature sensors 36a, 36b, 36c disposed on the incident-side polarizing plates 9a, 9b, 9c, and the temperature sensors 37a, 37b, 37c disposed in the vicinity of the liquid crystal panels 10a, 10b, 10c, thereby measuring a temperature change inside the projector that has been caused by an environmental change (steps 205a, 205b, 205c).

Thereafter, a determination is made as to whether the temperature that has been measured is below a predetermined temperature (set value) or not (steps 206a, 206b, 206c). If the temperature exceeds the set value, a voltage value to be input to the drive circuit of a fan for a corresponding optical path is changed to raise the revolving speed of the fan (steps 207a, 207b, 207c). If it is below the predetermined temperature in steps 206a and 206b, the stage returns to steps 205a and 205b.

Herein, if the temperature is equal to the predetermined temperature or below in step 206c when the fan 34c for the red optical path is controlled, detection is performed as to whether the setting of the optical system has been changed or not (step 208). If it is detected that the setting of the optical system has been changed while the liquid crystal projector is projecting light in step 208, i.e., if the optical setting has been changed to increase the brightness of the whole of an image by allowing the trimming filter 20 to retreat from the optical path, the voltage to be input to the drive circuit 51c of the fan 34c for red is raised to increase the revolving speed of the fan 34c (step 209).

If the setting of the optical system has not been changed in step 208, i.e., if the trimming filter 20 is still in the optical path for red, the stage returns to step 203c.

If it is detected that the power OFF signal of the liquid crystal projector has been input by the user in steps 204a, 204b, 204c, the illumination light source 1 is turned off. Thereafter, the revolving speed of the fans 34a to 34c, 22a to 22c are temporarily increased to rapidly cool the polarizing plates 9 to 9c, 11a to 11c, the liquid crystal panels 10a, 10b, 10c, and the prism 12 (steps 210a, 210b, 210c), and a main power source is turned off in step 211.

In the optical system of the liquid crystal projector structured in this way, the most suitable cooling that meets a condition for each color optical path can be carried out while achieving noise reduction by controlling the cooling of each color optical path independently.

Additionally, the most suitable cooling can always be carried out during the working of the projector by allowing the temperature sensors 35, 36a to 36c, 37a to 37c to apply feedback to the drive control of the fans 34a to 34c, 22a to 22c, even if the temperature conditions for each color optical path change while the projector is working.

In each embodiment shown in FIGS. 1 through 4, the cross dichroic prism 12 in which four right-angled triangular pole prisms are combined together is used as a color synthesizing optical system. However, if a so-called 3P (3-piece) prism or 4P (4-piece) prism constructed by sticking three or four prism elements different in shape together is used, the cooling structure described in each embodiment is advantageous to the cooling of the polarizing plates, the liquid crystal panels and the prism elements.

In comparison with the cross prism, the 4P prism has an advantage in that it can be manufactured at less cost without requiring absolute prism-sticking accuracy and that a stuck surface never appears as a white stripe on a screen. However, unlike the cross prism, the 4P prism does not have a structure in which the polarizing plate and the liquid crystal panel are situated in an area surrounded by a pitch of 90 degrees (i.e., in the 4P prism, the polarizing plate and the liquid crystal panel are away therefrom). Therefore, in order to cool them by means of a single axial fan, a conventional method needs to provide such a large axial fan so as to surround the polarizing plates and the liquid crystal panels disposed in all of the optical paths.

In contrast to the conventional method, in this embodiment, cooling can be efficiently carried out without using a large axial fan by disposing a cooling unit for each color optical path independently.

The 4P prism is constructed by combining four prism elements different in shape together in the state of interposing an air layer therebetween. Therefore, in some cases, the volume of the prism element facing to a chromatic light path differs from that of the prism elements facing to other chromatic light paths. In the structure in which the polarizing plate is stuck to the prism element, the prism element absorbs the heat of the polarizing plate. In this structure, heat capacities of the prism elements are different each other according to difference in volume of the prism (it is to be noted that thermal conductivities of the prism elements are the same). As a result, cooling conditions for three color chromatic light paths are different each other.

The same applies to the incident-side polarizing plate. Generally, the incident-side polarizing plate is stuck onto a plate that has been cut out of, for example, a sapphire crystal that has good thermal conductivity or onto a plane-convex lens whose center part is thick. Therefore, in some cases, a difference in thermal conductivity or in volume among optical elements stuck to the polarizing plate provides a difference in cooling conditions among chromatic rays of light.

In this embodiment in consideration of this difference in conditions, the driving of each fan which is a cooling unit is controlled for each chromatic light path (i.e., the driving thereof is controlled to give a large amount of cooling air to the prism and the polarizing plate so that the smaller the heat capacities of the prism and polarizing plate the larger the amount of cooling air), and thereby they can be efficiently cooled.

Figure 5:
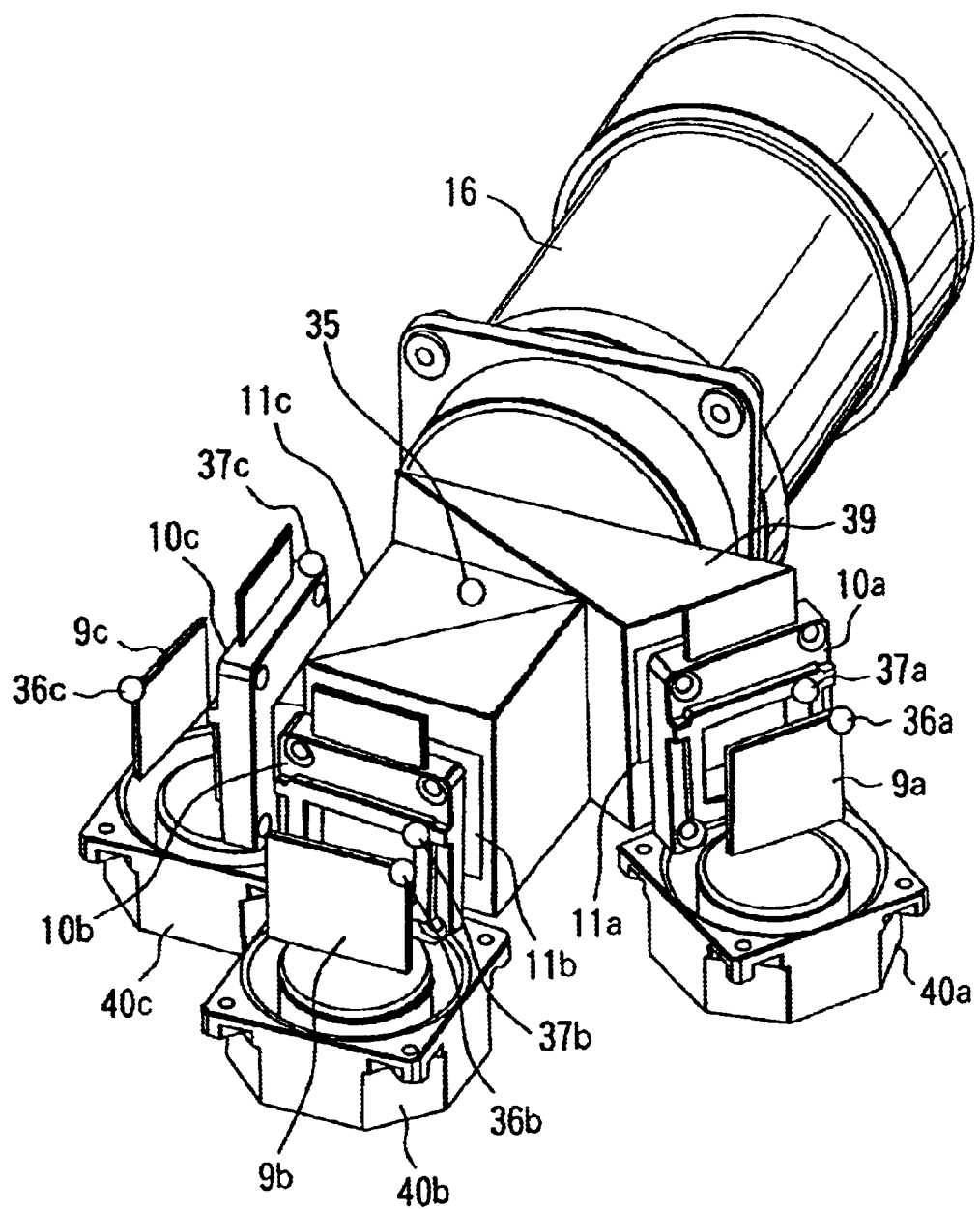
FIG. 5 is a perspective view showing a light modulating part, a projection optical system, and a cooling structure of the liquid crystal projector (projection type image display apparatus) which is still another embodiment of the present invention.

FIG. 5 shows a cooling structure of an embodiment that uses a 4P (4-piece) prism 39.

In this embodiment, the same reference characters as in the aforementioned embodiments are given to the same constituent parts as in the aforementioned embodiments, and a description thereof is omitted.

As shown in this figure, three axial fans are used. Axial fans 40a, 40b, 40c cool the incident-side polarizing plates 9a, 9b, 9c, the liquid crystal panels 10a, 10b, 10c, and the outgoing-side polarizing plates 11a, 11b, 11c, respectively.

In this embodiment, the outgoing-side polarizing plates 11a, 11b, 11c can each be disposed with an air space from each surface of the prism 39, and at least one of the outgoing-side polarizing plates 11a, 11b, 11c can be stuck directly onto at least one of the incident surfaces for the respective chromatic lights of the prism 39. All of the outgoing-side polarizing plates 11a, 11b, 11c can, of course, be stuck onto the prism 39. If the outgoing-side polarizing plates 11a, 11b, 11c are stuck onto the prism 39, the cooling air from each fan (40a, 40b, 40c) is supplied to each polarizing plate (9a to 9c, 11a to 11c) and to each prism element of the prism 39, thereby cooling the incident-side polarizing plates 9a, 9b, 9c, the liquid crystal panels 10a, 10b, 10c, the outgoing-side polarizing plates 11a, 11b, 11c, and the prism 39.

Figure 6:
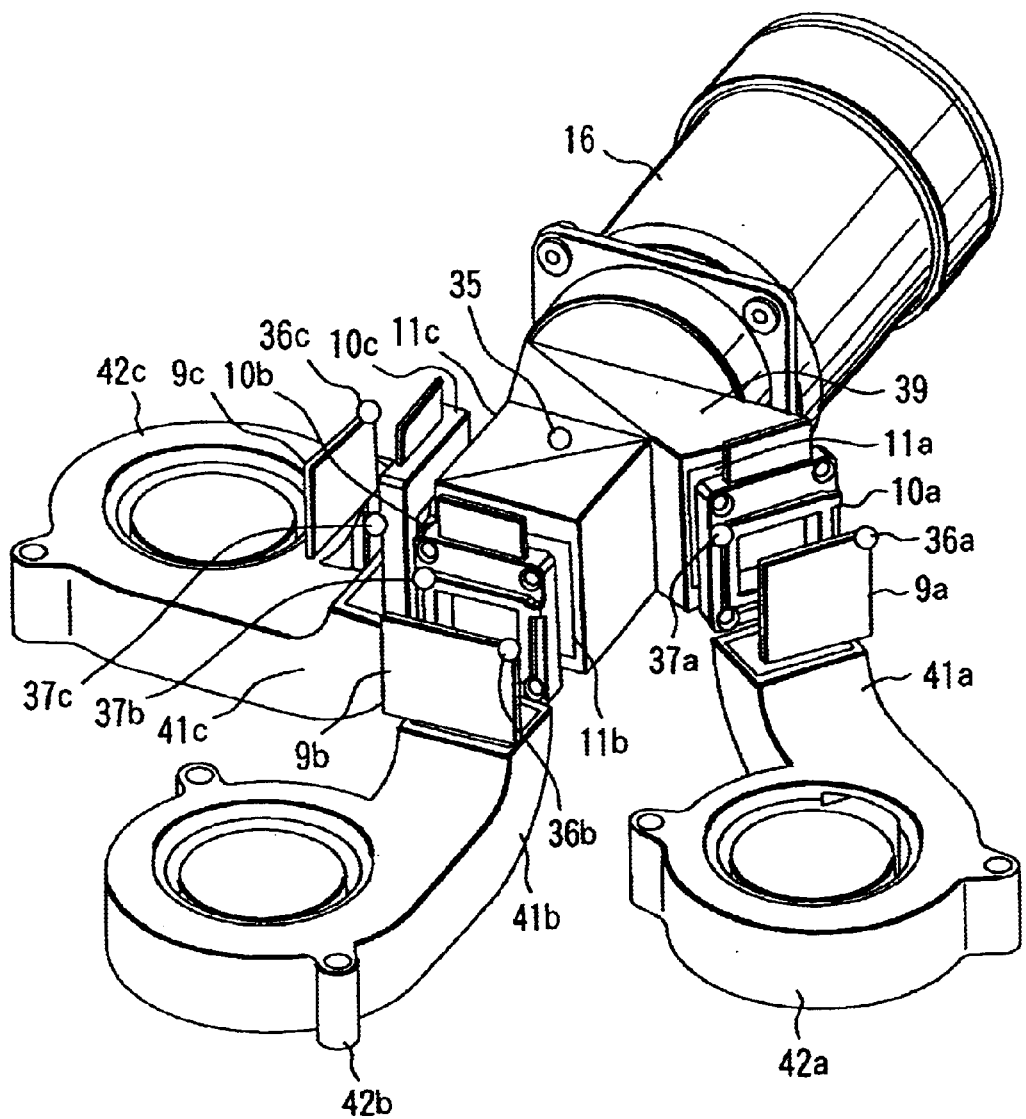
FIG. 6 is a perspective view showing a light modulating part, a projection optical system, and a cooling structure of the liquid crystal projector (projection type image display apparatus) which is still another embodiment of the present invention.
Figure 7:
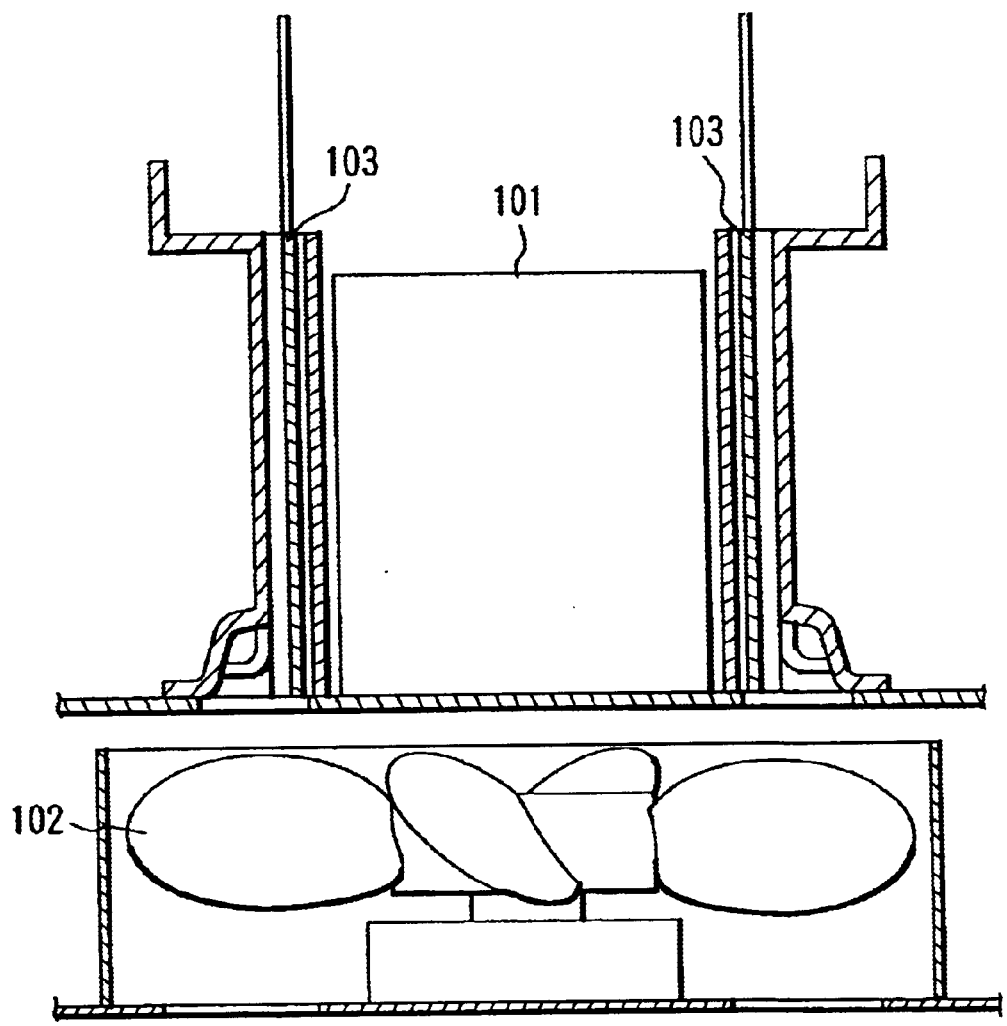
FIG. 7 is an example of a cooling device of a conventional liquid crystal projector.
Figure 8:
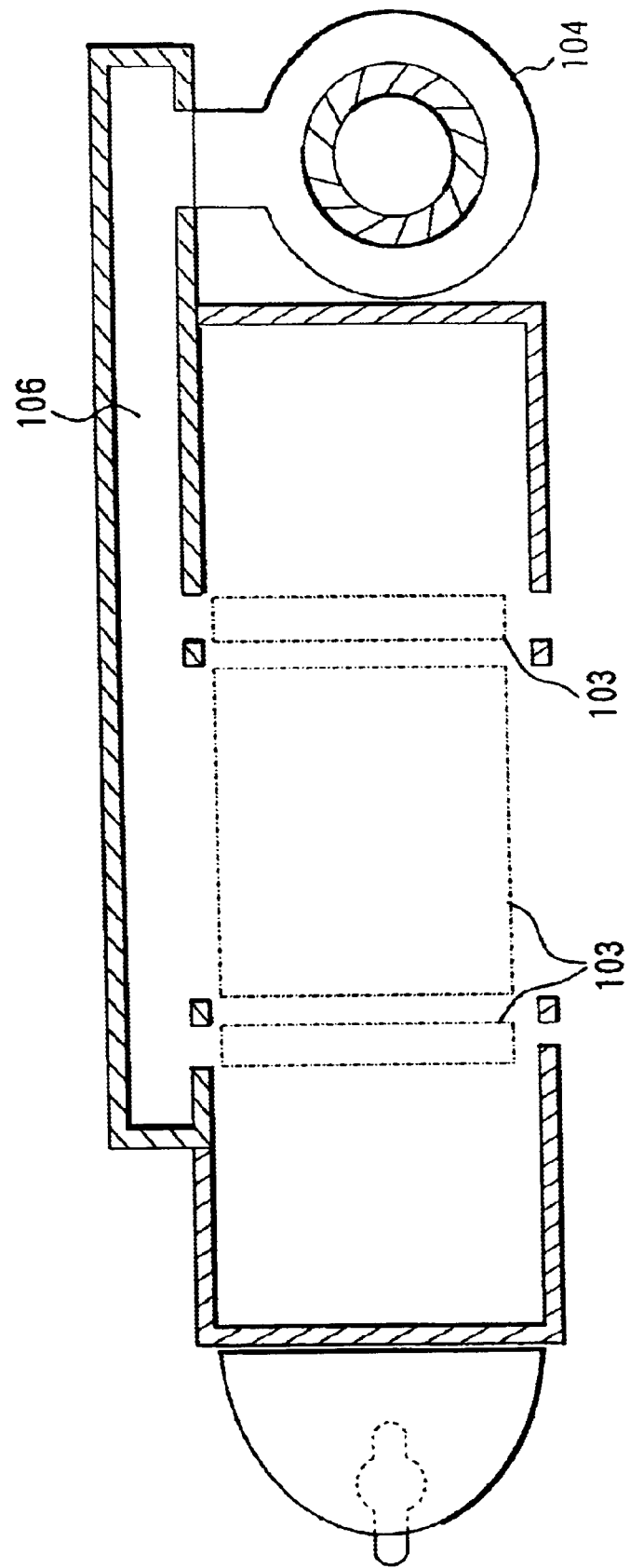
FIG. 8 is an example of a cooling device of a conventional liquid crystal projector.
Figure 9:
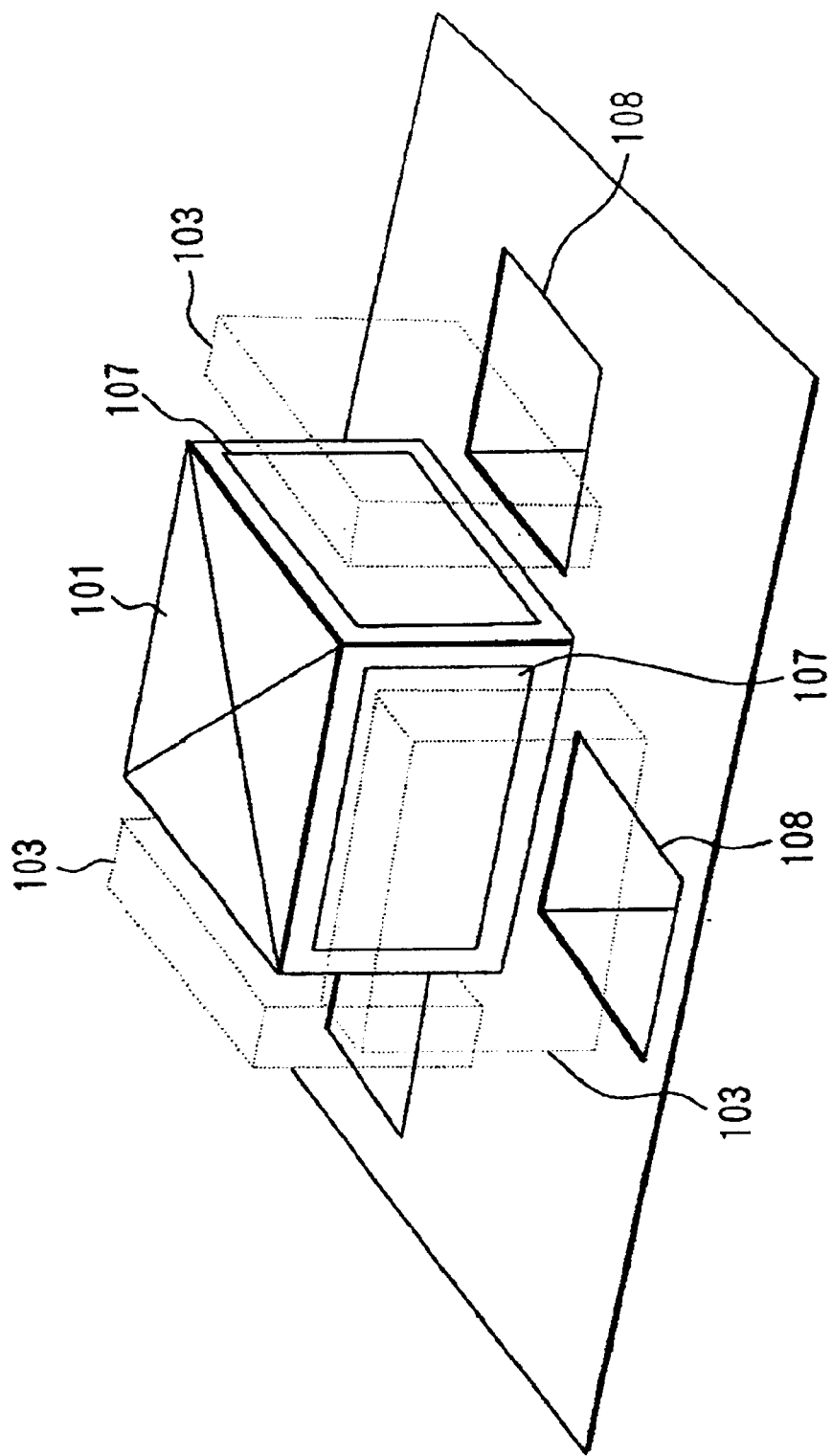
FIG. 9 is an example of a cooling device of a conventional liquid crystal projector.

Even when the 4P prism (or 3P prism) is used as in the embodiment shown in FIG. 5, sirocco fans 42a, 42b, 42c and ducts 41a, 41b, 41c can be provided as shown in FIG. 6 instead of the axial fans 40a, 40b, 40c.

FIG. 6 shows an embodiment that uses the 4P prism 39, and shows a cooling structure that uses sirocco fans. In this embodiment, the same reference characters are given to the same constituent parts as those in FIG. 1, FIG. 2, and FIG. 5, and a description thereof is omitted.

As a result of providing the ducts 41a, 41b, 41c as in the embodiment shown in FIG. 6, the sirocco fans 42a, 42b, 42c can be placed down disposed inside the liquid crystal projector, or the positions of the fans 42a, 42b, 42c can be easily changed by drawing the ducts 41a, 41b, 41c around. Therefore, the degree of freedom of the layout in the liquid crystal projector can be improved.

Additionally, since the sirocco fan has a structural advantage of being able to realize noise reduction more easily than an axial fan, use of the sirocco fan is advantageous to noise reduction of the liquid crystal projector itself.

Additionally, the most suitable cooling can be carried out for each color optical path by changing the specification of each sirocco fan in accordance with a cooling condition needed for each color optical path.

An axial fan can be used for at least one color optical path among the three color optical paths, and sirocco fans and ducts can be disposed in the remaining color optical paths. A thermoelectric exchange element, such as a Peltier element, can also be incorporated.

Additionally, in the embodiments shown in FIG. 5 and FIG. 6, the three fans 40a to 40c, 42a to 42c can be made identical in kind and in specifications, and, in order to change the cooling conditions, the fans disposed in the three color optical paths, respectively, can be controlled independently of each other. As a result, manufacturing costs can be reduced.

As described above, according to the aforementioned embodiments, the image forming plate and the polarizing plate or the like disposed in the vicinity thereof in each color optical path can be cooled by a cooling unit that has a cooling capacity suitable for a cooling condition needed for each color optical path. Therefore, cooling can be carried out most suitably for each color optical path, and cooling that is superior in efficiency and in balance can be carried out.

While preferred embodiments have been described, it is to be understood that modification and variation of the present invention may be made without departing from the sprit or scope of the following claims.

What is claimed is:

1. A projection type image display apparatus which projects and displays a color image, comprising:

a color separation optical system which separates illumination light into a plurality of chromatic rays of light;

a plurality of image forming panels illuminated with the plurality of chromatic rays of light, respectively;

a color synthesizing optical system which synthesizes rays of light emitted from the plurality of image forming panels illuminated therewith;

a light-quantity changing member which changes a quantity of light incident upon at least one of the plurality of image forming panels, the light-quantity changing member moving an element which reduces the quantity of light transmitted therethrough, into and out of an optical path of the light incident upon at least one of the plurality of image forming panels; and a plurality of cooling units which cool areas around the plurality of image forming panels, respectively, wherein a cooling capacity of at least one of the plurality of cooling units when the element is in the optical path, is less than the cooling capacity of the at least one of the plurality of cooling units when the element is out of the optical path, wherein a cooling capacity of at least one of the plurality of cooling units is different from that of another one of the plurality of cooling units.

2. The projection type image display apparatus according to claim 1, wherein the plurality of cooling units each comprise an air-blowing unit, and an air capacity of at least one of the air-blowing units is different from those of the other air-blowing units.

3. The projection type image display apparatus according to claim 1, wherein the plurality of cooling units comprise a sirroco fan and a duct, respectively.

4. The projection type image display apparatus according to claim 1, further comprising a polarizing element disposed in the vicinity of each of the image forming panels, the polarizing element being also cooled by each of the cooling units.

5. The projection type image display apparatus according to claim 4, wherein the color synthesizing optical system is made up of a plurality of optical elements, and each of the optical elements are cooled by each of the cooling units.

6. The projection type image display apparatus according to claim 5, wherein at least one of the optical elements is different in volume from the other optical elements.

7. A projection type image display system comprising the projection type image display apparatus according to claim 1 and an image information feeder which supplies image information that is to be displayed on each of the image forming panels to the projection type image display apparatus.

8. A projection type image display apparatus according to claim 1, wherein one of the plurality of cooling units is a fan which has an axis-flowing fan that sends wind in a direction of the axis of rotation, and another is a sirroco fan which sends wind in a direction of the rotational tangent.

9. A projection type image display apparatus according to claim 1, wherein one of the plurality of cooling units has a Peltier element.

10. A projection type image display apparatus according to claim 1, further comprising:

a measuring sensor which measures the temperature in the vicinity of the image-forming panel, wherein the cooling capacity of the cooling units is changeable according to the measured results of the sensor.

11. A projection type image display apparatus according to claim 1, wherein the light changing member rotates the element around an axis extending in a direction substantially perpendicular to the optical path.

12. A projection type image display apparatus according to claim 1, wherein the element is a trimming filter through which only light of a predetermined wavelength region is transmitted.

13. A projection type image display apparatus which projects and displays a color image, comprising:

a color separation optical system which separates illumination light into a plurality of chromatic rays of light;

a plurality of image forming panels illuminated with the plurality of chromatic rays of light, respectively;

a color synthesizing optical system which synthesizes rays of light from the plurality of image forming panels illuminated therewith;

a light-quantity changing member which changes a quantity of light incident upon at least one of the plurality of image forming panels, the light-quantity changing member moving an element which reduces the quantity of light transmitted therethrough, into and out of an optical path of the light incident upon at least one of the plurality of image forming panels;

a plurality of cooling units which cool areas around the plurality of image forming panels, respectively, wherein a cooling capacity of at least one of the plurality of cooling units when the element is in the optical path, is less than the cooling capacity of the at least one of the plurality of cooling units when the element is out of the optical path; and a control circuit which controls the plurality of cooling units, wherein the control circuit controls at least one of the plurality of cooling units independent of the other cooling units.

14. The projection type image display apparatus according to claim 13, wherein the plurality of cooling units each consist of an air-blowing fan, and the control circuit controls a revolving speed of at least one of the air-blowing fans so as to be different from those of the other air-blowing fans.

* * * * *